P. STENGER.
MANUFACTURE OF PLATE GLASS.
No. 13,411.  Patented Aug. 7, 1855.
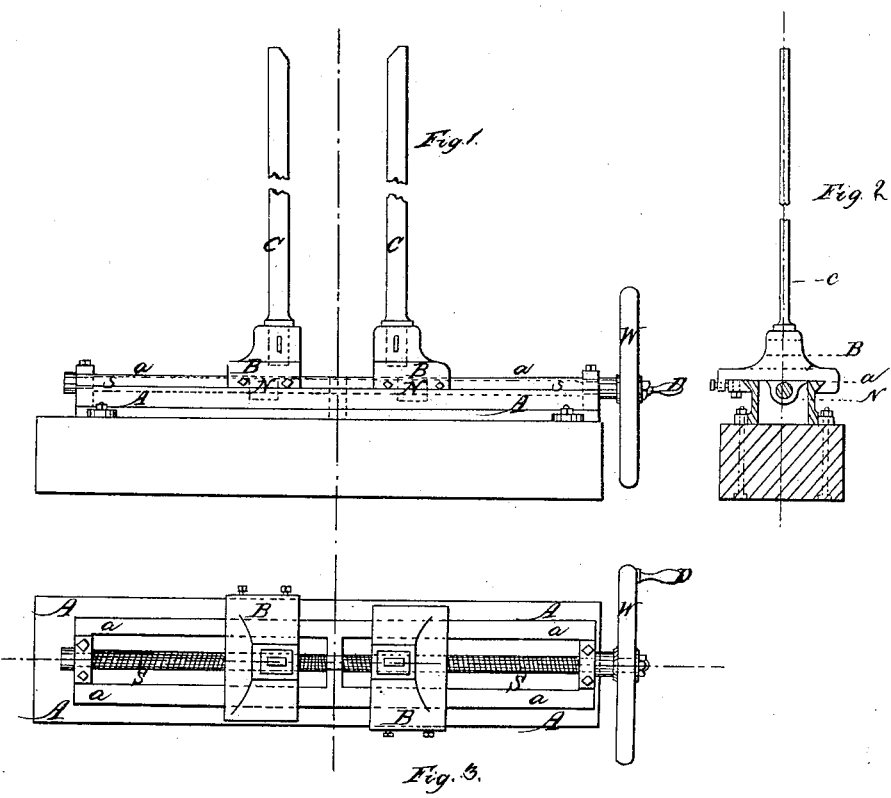

P. STENGER.
MANUFACTURE OF PLATE GLASS.
No. 13,411. Patented Aug. 7, 1855.
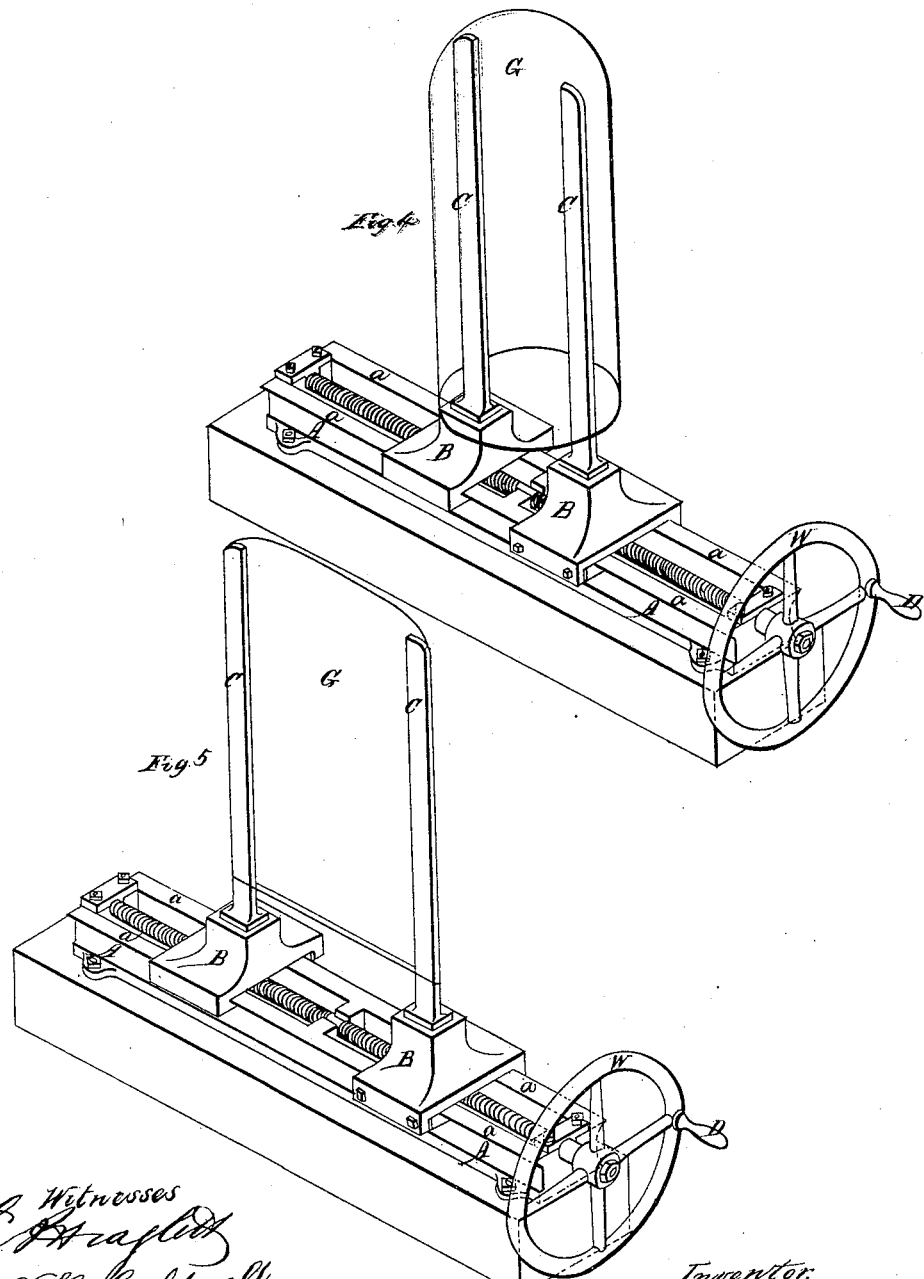

UNITED STATES PATENT OFFICE.

PHILIP STENGER, OF PHILADELPHIA, PENNSYLVANIA, ASSIGNOR TO PASCAL YEARSLEY.

MANUFACTURE OF PLATE-GLASS.

Specification of Letters Patent No. 13,411, dated August 7, 1855.

*To all whom it may concern:*

Be it known that I, PHILIP STENGER, a native of France, have invented a new and useful Improvement in the Manufacture of Sheet-Glass; and I do hereby declare that the following is a full and exact description thereof, reference being had to the accompanying drawings and to the letters of reference marked thereon.

The nature of my invention consists in stretching the cylinders of glass while in a soft or plastic condition into sheets instead of opening the cylinders along their sides and spreading them out as in the method heretofore generally practiced.

To enable others skilled in the art to make and use my invention I will proceed to describe its construction and operation.

In the accompanying drawings Figure 1, represents a longitudinal vertical section. Fig. 2, is a vertical cross section. Fig. 3, is a horizontal section. Fig. 4, is a drawing of the machine in perspective with a cylinder of glass thereon before being stretched. Fig. 5, is a drawing of the machine in perspective with a cylinder of glass thereon as the same appears when stretched.

I construct a bed plate or shears as at A A having guides *a a* placed along its lateral edges and which as well as the rest of the mechanical arrangement herein described should be of iron or other metal. On these guides I place two cross heads or carriages as shown at B, B which rest and move thereon. Along the central line of said bed-plate and passing from end to end thereof is a screw as shown at S S which is turned or moved by a balance wheel W and crank D. The thread of this screw through one half of its length is a right hand thread and through the other half of its length a left hand thread. This screw passes through nuts N N attached to the bottoms of the cross-heads or carriages, each of these nuts having a female screw adapted to that half of the screw along which it is intended to move: so that by turning the balance wheel and crank the action of the screw moves the cross-heads or carriages in opposite directions, rising from the tops of the cross heads or carriages I place two vertical uprights or standards as shown at C, C, either permanently attached to the same or so secured by keys or other mechanical contrivance as to be removable at pleasure.

The mode of using the machine above described is as follows: The machine may be placed on a fixed table or other suitable foundation in the immediate nighborhood of the glass furnace. The workman having formed the cylinder of glass at the end of his blowing iron in the ordinary way without detaching it from the iron drops or places it over the vertical uprights or standards (as shown in Fig. 4, letter G) care being taken that the cylinder is sufficiently heated to be of a soft or plastic consistency. The vertical uprights or standards are then moved in opposite directions by turning the balance wheel and crank. The vertical uprights or standards being rigid and the movement of the cross heads or carriages along the guides being true, the cylinder is thus stretched or extended into the form of two parallel sheets of glass connected at their upper edges and along the lines of contact with the vertical uprights or standards, (as shown in Fig. 5, letter G). The whole is then removed from the machine and the blowing iron together with the surplus material adhering to it being detached by the usual means, the glass is readily separated by like means into two rectangular sheets.

I do not mean to confine myself to the particular form of mechanical arrangement above described. Various modifications of the same machine will readily suggest themselves. For instance one of the cross-heads together with the vertical upright attached to the same may be permanently fixed to one end of the bed plate or shears and the other vertical upright may be placed on a movable carriage with a nut as before described. In this modification of the machine the thread of the screw need be cut in one direction only. The machine instead of being placed on a fixed table in the immediate neighborhood of the glass furnace, may be placed within a furnace or arm constructed for its reception and may be operated from without by means of suitable gearing.

What I claim as my invention and desire to secure by Letters Patent is—

The application of tractile force to the manufacture of sheet glass by means of the mechanical arrangement hereinbefore described as its substantial equivalent.

PHILIP STENGER.

Witnesses:
JOHN CALDWELL,
CHAS. HEAGLETT.